(12) United States Patent
Wong et al.

(10) Patent No.: US 11,394,717 B2
(45) Date of Patent: Jul. 19, 2022

(54) DIGITALLY SECURE TRANSACTIONS OVER PUBLIC NETWORKS

(71) Applicant: Kyndryl, Inc., New York, NY (US)

(72) Inventors: Kim Poh Wong, Singapore (SG); Vineet Prakash, Singapore (SG); Sonthaya Merin, Bangkok (TH)

(73) Assignee: Kyndryl, Inc., New York, NY (US)

( * ) Notice: Subject to any disclaimer, the term of this patent is extended or adjusted under 35 U.S.C. 154(b) by 218 days.

(21) Appl. No.: 16/839,723

(22) Filed: Apr. 3, 2020

(65) Prior Publication Data

US 2021/0314324 A1    Oct. 7, 2021

(51) Int. Cl.
| | |
|---|---|
| H04L 29/00 | (2006.01) |
| H04L 9/40 | (2022.01) |
| H04L 9/30 | (2006.01) |
| G06F 21/62 | (2013.01) |
| G06Q 20/06 | (2012.01) |
| H04L 9/08 | (2006.01) |

(52) U.S. Cl.
CPC ........ H04L 63/102 (2013.01); G06F 21/6227 (2013.01); G06Q 20/06 (2013.01); H04L 9/0894 (2013.01); H04L 9/30 (2013.01); H04L 63/1433 (2013.01); H04L 2209/56 (2013.01)

(58) Field of Classification Search
CPC ...... G06F 21/6227; G06F 21/57; G06F 21/53; G06F 21/645; G06F 21/6209; G06F 2221/033; H04L 63/0428; H04L 63/102; H04L 9/0894; H04L 9/30; H04L 63/105; H04L 63/1433; H04L 2209/56; G06Q 20/06
See application file for complete search history.

(56) References Cited

U.S. PATENT DOCUMENTS 9,992,022 B1 * 6/2018 Chapman ............... G06F 21/64
10,102,526 B1 * 10/2018 Madisetti ............. G06Q 20/065
(Continued)

FOREIGN PATENT DOCUMENTS

WO    WO2019089044    5/2019

OTHER PUBLICATIONS

Ahsan Manzoor, et al., "Blockchain Based Proxy Re-Encryption Scheme for Secure IoT Data Sharing", 2019 IEEE International Conference on Blockchain and Cryptocurrency, https://arxiv.org/ftp/arxiv/papers/1811/1811.02276.pdf.
(Continued)

*Primary Examiner* — Don G Zhao
(74) *Attorney, Agent, or Firm* — Heslin Rothenberg Farley & Mesiti P.C.; Erik Swanson, Esq.

(57) ABSTRACT

A method, computer program product, and a system where a processor(s) obtains, via a web interface, from a client, over a public network connection, a request to register for a financial transaction; a smart contract comprises the requested financial transaction. The processor(s) maps the client to a pre-defined security profile based on a security level associated with the security profile. The processor(s) selects, based on the security level, encryption keys from a repository and security codes. The processor(s) executes an encryption script, to automatically encrypt the contents of the smart contract utilizing the encryption keys and the security codes and by embedding SafeMath library codes in the smart contract.

20 Claims, 8 Drawing Sheets

(56) References Cited

U.S. PATENT DOCUMENTS

| | | | | |
|---|---|---|---|---|
| 2015/0379510 | A1* | 12/2015 | Smith | G06Q 20/3829 |
| | | | | 705/71 |
| 2017/0155515 | A1* | 6/2017 | Androulaki | H04L 9/008 |
| 2017/0221052 | A1* | 8/2017 | Sheng | G06Q 20/3829 |
| 2017/0344988 | A1* | 11/2017 | Cusden | G06F 21/00 |
| 2018/0019879 | A1* | 1/2018 | Kravitz | H04L 9/3236 |
| 2018/0019993 | A1* | 1/2018 | Kravitz | G06F 21/645 |
| 2018/0097635 | A1* | 4/2018 | Moses | H04L 9/3236 |
| 2018/0191503 | A1* | 7/2018 | Alwar | H04L 9/0637 |
| 2018/0309581 | A1 | 10/2018 | Butler et al. | |
| 2018/0322587 | A1* | 11/2018 | Linne | H04L 9/3236 |
| 2019/0026716 | A1* | 1/2019 | Anbukkarasu | G06Q 20/389 |
| 2019/0073666 | A1* | 3/2019 | Ortiz | G06F 16/27 |
| 2019/0080392 | A1* | 3/2019 | Youb | G06Q 20/401 |
| 2019/0158275 | A1* | 5/2019 | Beck | G06F 16/2379 |
| 2019/0197532 | A1* | 6/2019 | Jayachandran | G06Q 20/3829 |
| 2019/0236286 | A1* | 8/2019 | Scriber | G06F 21/6245 |
| 2019/0305932 | A1* | 10/2019 | Townsend | H04L 9/0637 |
| 2019/0318346 | A1* | 10/2019 | Ben-David | H04L 9/14 |
| 2019/0372786 | A1* | 12/2019 | Ra | H04W 12/084 |
| 2019/0378142 | A1* | 12/2019 | Darnell | G06F 21/645 |
| 2020/0005290 | A1* | 1/2020 | Madisetti | G06Q 20/02 |
| 2020/0019865 | A1* | 1/2020 | Wang | H04L 67/10 |
| 2020/0145192 | A1* | 5/2020 | Elkhiyaoui | H04L 9/3218 |
| 2020/0159891 | A1* | 5/2020 | Patel | G06F 16/9024 |
| 2020/0175181 | A1* | 6/2020 | Hughes | G06F 16/287 |
| 2020/0250511 | A1* | 8/2020 | Hu | G06N 3/0427 |
| 2020/0250747 | A1* | 8/2020 | Padmanabhan | G06N 5/04 |
| 2020/0285745 | A1* | 9/2020 | Chen | G06F 21/31 |
| 2020/0313904 | A1* | 10/2020 | Ramgopal | G06F 21/602 |
| 2020/0351235 | A1* | 11/2020 | Shang | H04L 45/74 |
| 2020/0366471 | A1* | 11/2020 | Jo | H04L 67/104 |
| 2021/0058353 | A1* | 2/2021 | Creech | H04L 51/22 |
| 2021/0150626 | A1* | 5/2021 | Robotham | G06Q 40/00 |
| 2021/0201326 | A1* | 7/2021 | Ambikapathi | H04L 9/0637 |
| 2021/0266167 | A1* | 8/2021 | Lohe | H04L 9/0643 |

OTHER PUBLICATIONS

Joshua Herman, "Practicing Safemath for Smart Contracts with Solidarity and Openzeppelin", May 18, 2018, https://medium.com/coinmonks/practicing-safemath-with-solidity-and-openzeppelin-cde4cba9ce39.

Mell et al., "The NIST Definition of Cloud Computing", National Institute of Standards and Technology, U.S. Dept. of Commerce, NIST Special Publ. 800-145, Sep. 2011, 7 pages.

\* cited by examiner

DIGITALLY SECURE TRANSACTIONS OVER PUBLIC NETWORKS

BACKGROUND

As data security concerns rise, authentication to various websites, applications, and/or web services, where sensitive and/or financial transactions are undertaken by users, has become more elaborate. Some individuals desire to bank entirely online, without visiting brick and mortar locations, by only accessing a web interface. However, concerns about security and authentication, including but not limited to, having no official and secured transaction control and protection, which are a contractual obligation in financial regulatory requirements, have caused certain banks and financial institutions to limit the online activities of their customers.

SUMMARY

Shortcomings of the prior art are overcome and additional advantages are provided through the provision of a method for securing a smart contract in a digital environment. The method includes, for instance: obtaining, by one or more processors, via a web interface, from a client, over a public network connection, a request to register for a financial transaction, wherein the request comprises client information and transaction information, wherein a smart contract comprises the requested financial transaction; mapping, by the one or more processors, the client to a pre-defined security profile, wherein the security profile comprises a protocol for encrypting contents of the smart contract based on a security level associated with the security profile; selecting, by the one or more processors, based on the security level, encryption keys from a repository; selecting, by the one or more processors, based on the security level, security codes; and executing, by the one or more processors, an encryption script, to automatically encrypt the contents of the smart contract, wherein the encryption script utilizes the encryption keys and the security codes to encrypt the contents of the smart contract, wherein the executing comprises embedding SafeMath library codes in the smart contract.

Shortcomings of the prior art are overcome and additional advantages are provided through the provision of a computer program product for securing a smart contract in a digital environment. The computer program product comprises a storage medium readable by a processing circuit and storing instructions for execution by the processing circuit for performing a method. The method includes, for instance: obtaining, by the one or more processors, via a web interface, from a client, over a public network connection, a request to register for a financial transaction, wherein the request comprises client information and transaction information, wherein a smart contract comprises the requested financial transaction; mapping, by the one or more processors, the client to a pre-defined security profile, wherein the security profile comprises a protocol for encrypting contents of the smart contract based on a security level associated with the security profile; selecting, by the one or more processors, based on the security level, encryption keys from a repository; selecting, by the one or more processors, based on the security level, security codes; and executing, by the one or more processors, an encryption script, to automatically encrypt the contents of the smart contract, wherein the encryption script utilizes the encryption keys and the security codes to encrypt the contents of the smart contract, wherein the executing comprises embedding SafeMath library codes in the smart contract.

Methods and systems relating to one or more aspects are also described and claimed herein. Further, services relating to one or more aspects are also described and can be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
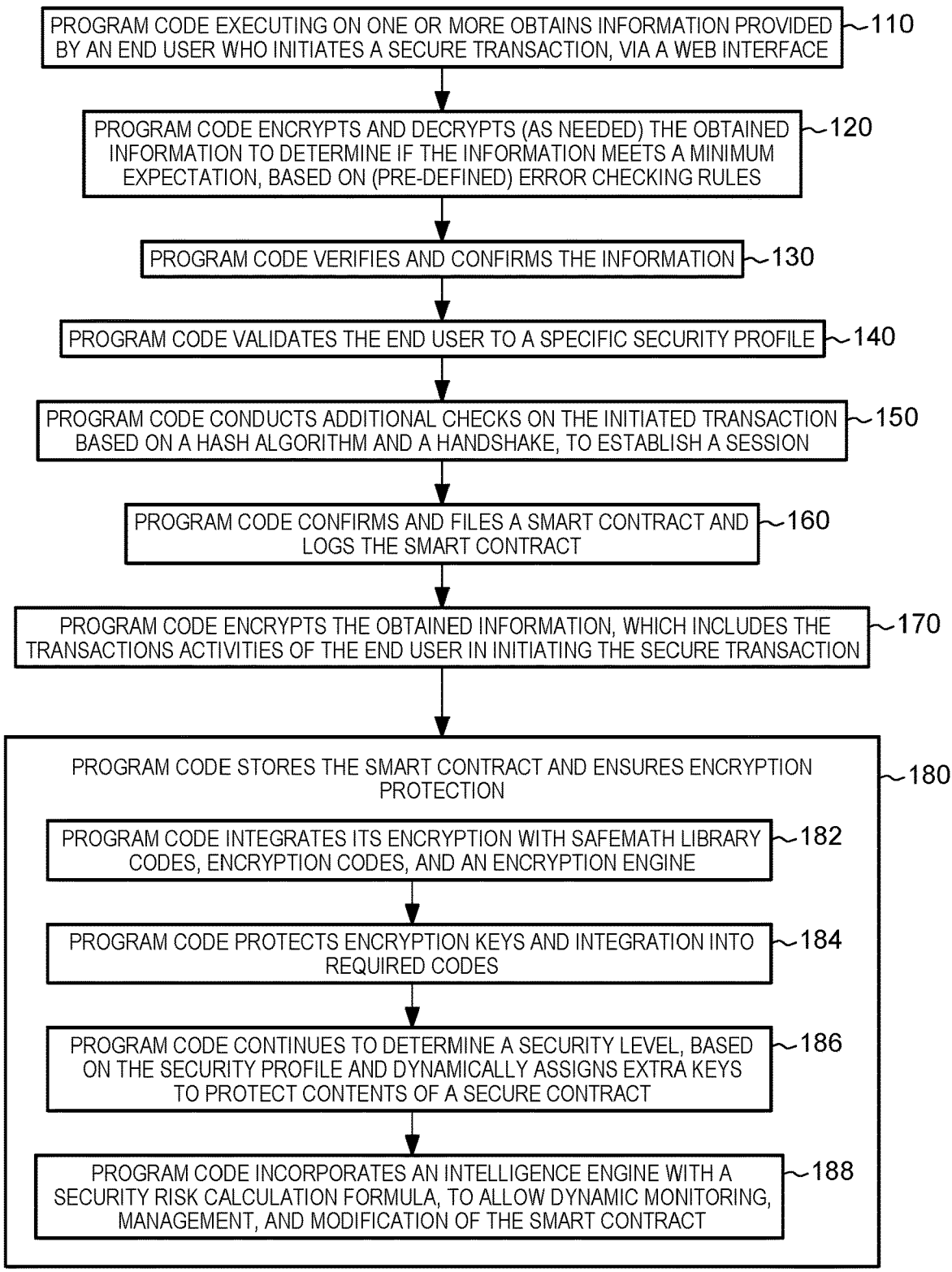
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
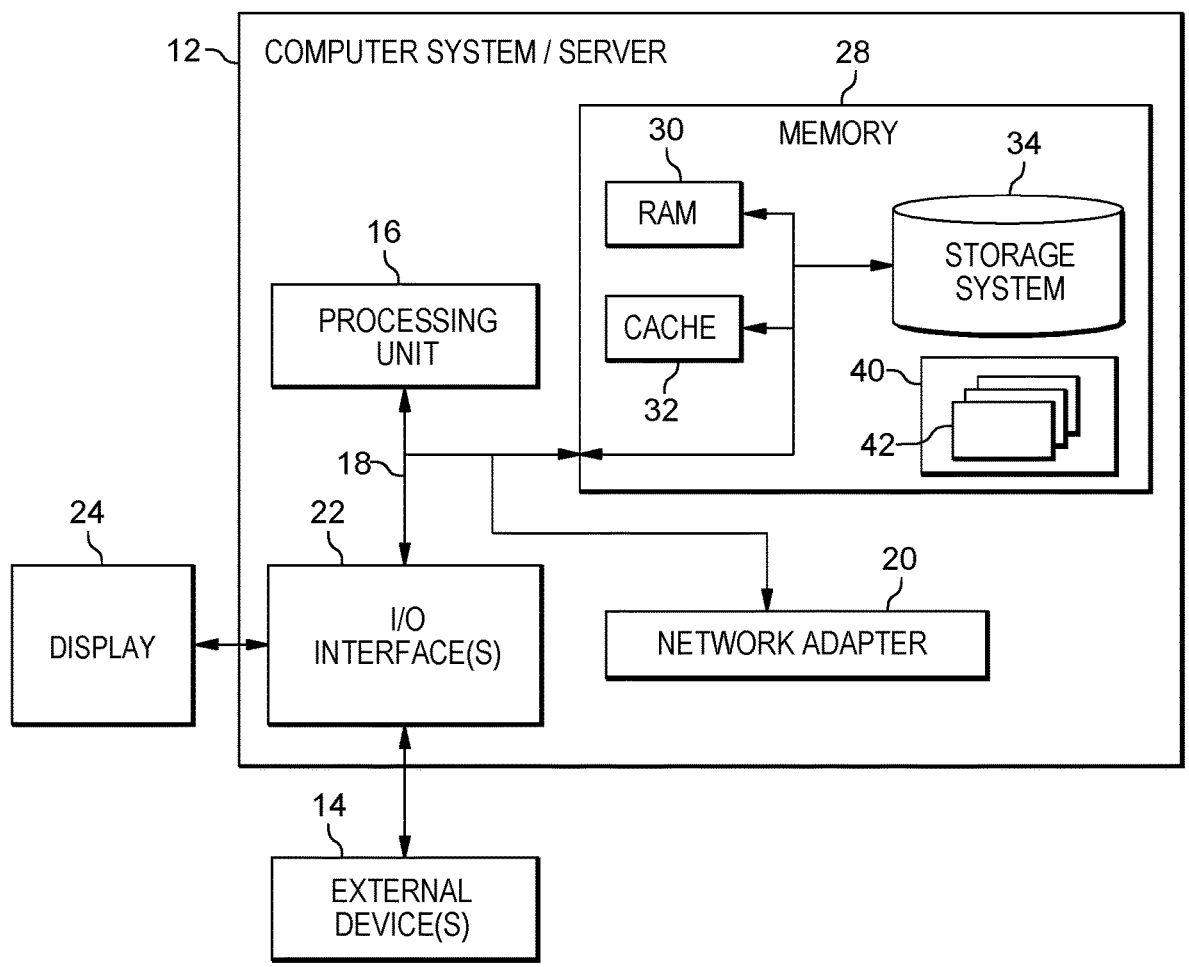
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, can be stored in memory 28.

There exists a user expectation of being able to access all data over personal computing devices, including but not limited to, mobile computing devices. However, in some cases, the type of data desired by customers is constrained by security policies, including various legal guidelines. When the data is particularly sensitive, even though accessing it remotely, quickly, and easily, is desirable from a consumer standpoint (and often from the data provider standpoint), logistically, this type of access is complicated based on the need to maintain a high level of security and thus, access is limited despite the utility of providing this access. One such challenge that includes data security concerns is when a client (e.g., bank, financial institution) is unable to transact business via a web-only (thin client) banking environment, without a brick and mortar location. The business transactions can be limited in this case based on the lack of official and/or secured transaction control and protection, as contractual obligations can impose financial regulatory requirements, locally. When operating in a public domain, such as in a web-only environment, aspects of embodiments of the present invention provide controlled and protected transactions.

Embodiments of the present invention include a computer-implemented method, a computer program product, and a computer system where program code executing on at least one processor provides a dynamic method to secure a smart contract in a digital environment. A smart contract is a computer protocol intended to digitally facilitate, verify, or enforce negotiation or performance of a contract and transactions, including financial transaction, can be performed under this contract. Smart contracts allow the performance of credible transactions without third parties. These transactions are trackable and irreversible. The aim of smart contracts is to provide security that is superior to traditional contract law and to reduce other transaction costs associated with contracting. Embodiments of the present invention facilitate security around the smart contract in a web-only transactional environment.

Aspects of various embodiments of the present invention are inextricably linked to computing at least because embodiments of the present invention address a challenge specific to computing: enabling secure transactions utilizing public networks, such as over the Internet, while utilizing web-only interfaces to invoke the transactions. Thus, embodiments of the present invention introduce unique security measures that enable this functionality, which addresses security issues in electronic transactions. As will be discussed herein, embodiments of the present invention address these security issues by introducing, into the transaction environment, various unique features, including but not limited to program code comprising a security risk intelligence engine, a library referred to herein as a SafeMath Library, and unique encryption codes. These aspects enable integration of control and protection of a secure, private, and non-web-exclusive, digital environment into a web-only technical environment. Utilizing various aspects of some embodiments of the present invention, the program code utilizes smart contract function activities that are not compromised, security-wise, in a web-enabled technical environment.

Not only are aspects of some embodiments of the present invention inextricably linked to computing, but they are also directed to a practical application, specifically, enabling secure transactions over public connections using thin clients (web interfaces) as connection points. As will be discussed in greater detail herein, embodiments of the present invention include program code that enables a client (e.g., a financial institution, a bank, etc.) to deploy a smart contract function that enables an end user (e.g., customers of the client), to register and participate in the web-only transactional activities (e.g., banking activities). For ease of understanding, various aspects of some embodiments of the present invention are described as modules, and thus, some embodiments of the present invention include: a security risk intelligence engine (also referred to herein as an intelligence engine), a SafeMath library, and unique encryption codes.

Embodiments of the present invention provide significant improvements over existing methods of securing transactions in a web-based environment. As will be described in greater detail herein, in embodiments of the present invention, program code executing on one or more processors obtains a transaction profile from a user who initiates or participates in a transaction, via the described smart contract functionality and stores the transaction profile. The program code additionally can utilize a unique encryption method to encrypt the activities of smart contract functionality, including but not limited to, utilizing SafeMath library codes (described herein), utilizing unique encryption codes, protecting and storing transaction profiles separately, and, thus, ensuring that smart contract contents are protected from compromising activities. To this end, as described herein, embodiments of the present invention incorporate an intelligent engine with a security risk calculation formula, to enable dynamic monitoring, management, and modification of encryption methods, based on transaction profiles. For example, by utilizing aspects of some embodiments of the present invention, an entity that provides (licensed) web-only access to digital banking business enables its end users (customers) to register and execute financial transactions over the Internet. The program code generates a smart contract based on information input by the user. The program code utilizes this information to map an authorized profile, based on a risk formula executed in an intelligence engine. In one example, the user acknowledges (the digitally created) smart contract and the program code supplements the transaction with security control components, which the program code utilizes to support encryption used to capture and protect the transactions executed digitally, via the smart contract. Embodiments of the present invention also provide an advantage over existing secure transaction methods because by the program code in embodiments of the present invention incorporating accuracy and code protections into the smart contracts generated by the program code, the program code ensures that a given client's web-only banking environment can continue to support different transactions, and constructively manage different financial models, when there is a change. This flexibility is of particular importance because financial models are constantly in flux in today's ever changing world.

FIG. 1 is a simplified workflow 100 that illustrates program code executing on one or more processors securing and managing transactions within smart contracts, in a digital environment, in accordance with various aspects of some embodiments of the present invention. By performing the illustrated aspects, end users can perform secure financial transactions with financial entities in a web-based environment without compromising security. As is illustrated in FIG. 1, embodiments of the present invention comprise various aspects of a (dynamic) method to secure smart contracts in a digital environment that includes an intelligence engine with a security risk calculation formula, that, when utilized by program code executing on one or more processors, enables dynamic monitoring, management, and modification of encryption methods, based on transaction profile and/or user profile. In some embodiments of the present invention, the program code performs one or more of the following aspects: 1) obtains the transaction profile from a user who initiates or otherwise participates in an electronic transaction, via function of smart contract; 2) stores the transaction profile; 3) utilizes different encryption methods to encrypt the activities of smart contract function; 4) uses SafeMath library codes; 5) uses unique encryption codes; and/or 6) protects and stores smart contracts uniquely to ensure the contents of the smart contracts are protected from being compromised. These aspects are illustrated in FIG. 1. Although certain of the aspects are illustrated as occurring sequentially, in some embodiments of the present invention, various aspects of the workflow 100 can occur asynchronously and/or in parallel, rather than in sequence.

Referring to FIG. 1, in some embodiments of the present invention, program code executing on one or more processors obtains information provided by an end user (a client of a financial institution) who initiates a secure transaction, via a web interface (110). The program code encrypts and decrypts (as needed) the obtained information to determine if the information meets a minimum expectation, based on (pre-defined) error checking rules (120) (i.e., the program code authenticates the user). The program code verifies and confirms the information (130). The program code validates the end user to a specific security profile (140). The program code conducts additional checks on the initiated transaction based on a hash algorithm and a handshake, to establish a session (150). The program code confirms and files a smart contract and logs the smart contract (160). The program code encrypts the obtained information, which includes the transactions activities of the end user in initiating the secure transaction (170). The program code stores the smart contract and ensures encryption protection (180). To ensure the encryption protection, the program code integrates its encryption with SafeMath library codes, encryption codes, and an encryption engine (182). The program code protects encryption keys and integration into required codes (184). The program code continues to determine a security level, based on the security profile and dynamically assigns extra keys (public, private, etc.) to protect contents of a secure contract (186). The program code incorporates an intelligence engine with a security risk calculation formula, to allow dynamic monitoring, management, and modification of the smart contract (188).

SafeMath functionality protects transactions from overflows. As discussed herein, security is an important aspect of smart contracts, but a common problem when dealing with numeric operations is the risk of overflow (or an underflow), which can create a security issue. For example, an overflow or an underflow occurs when an arithmetic operation reaches the maximum or minimum size of the type. For example, if program code stores a number in the unit 256 type, the number is stored in a 256 bits unsigned number ranging from 0 to $2^{256}$. But an integer overflow will occur when an arithmetic operation attempts to create a numeric value that is outside of the range that can be represented with a given number of bits, as the number is either larger than the maximum or lower than the minimum representable value. The most common result of an overflow is that the least significant representable bits of the result are stored; the result is said to wrap around the maximum (i.e., modulo power of two). Hence, an overflow condition gives incorrect results and, particularly if the possibility has not been anticipated, can compromise a program's reliability and security. When using the SafeMath library, the program code checks the results of the operations and throws an error stopping the execution of the smart contract. Thus, if an overflow or underflow were to occur, causing an inaccurate number, the contract would not be executed. In some embodiments of the present invention, the program code utilizes a SafeMath Library Code, an 8-bit unsigned integer that can store values between 0 and 255 (28-1).

In some embodiments of the present invention, in the risk equation (188), the risk equals impact multiplied by probability weighted against the cost: Risk=Impact*Probability/Cost. For example, the impact is the effect on an organization (e.g., web-only bank) which uses smart contracts for storing of all end customer's transactions, should a risk event occur.

Figure 2:
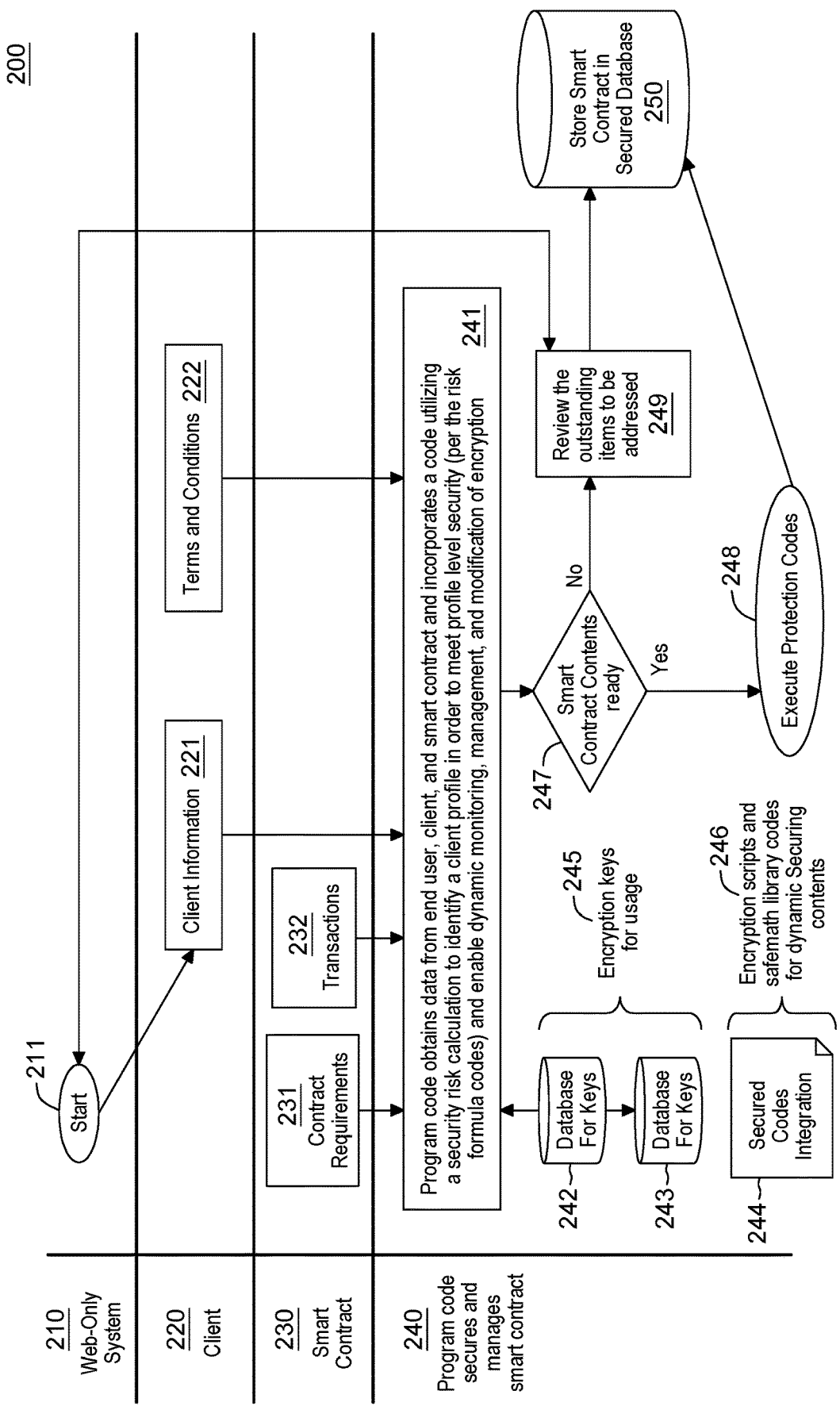
FIG. 2 illustrates various aspects of some embodiments of the present invention, including aspects of a technical environment and use of an intelligence engine with a security risk calculation formula to encrypt content of a secure contract.

Thus, as illustrated generally in FIG. 1, embodiments of the present invention include program code executing on one or more processors that executes a dynamic method to secure smart contracts in digital environment. FIG. 2 shows various aspects of this method in more detail. For example, FIG. 2, which will be discussed below, depicts the program code incorporating an intelligence engine with a security risk calculation formula, to allow dynamic monitoring, management, and modification of the encryption method, accordingly based on transaction profile and/or user profile 241. FIG. 2 also illustrates that the program code captures a transaction profile from user 211, 232 who makes/initiates a transaction via a function of a smart contract 231 and the program code stores the profile and smart contract 250. FIG. 2 also illustrated how the program code utilizes different encryption methods (depending on a profile to which a user is mapped) to encrypt the activities of smart contract function, using unique encryption codes to protect and store them uniquely 245, 246. FIG. 2 also illustrates the implementation, by the program code, of SafeMath library codes 246. Finally, FIG. 2 depicts the program code ensuring the smart contract contents are protected from activities being compromised 247.

To illustrated the aforementioned features, FIG. 2 is a flow chart that depicts a flow 200 of how aspects of embodiments of the present invention secure smart contracts in a digital environment. As depicted in FIG. 2, an end user, such as a client of a bank, wants to construct a smart contract for transactions executed. Referring to FIG. 2, the client 220, utilizing a web-only transaction system 210 initiates a transaction 211, through a web interface. From the initiation of the transaction, by the client 220 in the web-based transaction system 210 (e.g., a web browser interface), the program code obtains client information 221, and terms and condition 22 relevant to transacting with the client 220.

The program code obtains data from the client 220 and from the smart contract. The data obtained by the program code includes, but is not limited to, the client information 221, the terms and conditions 222 and also, from a smart contract 230, upon which the initiated transaction between the client and an entity (e.g., bank, financial institution, etc.) will be transacted, the smart contract requirements 231 and the transactions 232 of the smart contract. The program code obtains all the data and secures and manages the smart contract 240, including by incorporating a code with a security risk calculation formula 241. The program code determines how the contents of the smart contract should be secured based on mapping the client, based on transaction details and/or client data, to an existing security profile. The program code identifies the client profile using the risk formula codes, in order to meet a profile level and allow dynamic monitoring, management, and modification of the encryption method 241.

The program code encrypts the smart contract. To encrypt the smart contract, the program code analyzes the data and determines the keys 242, 243, from the database, which can include both public and private keys, to be used to encrypt contents of the smart contract 245. The keys are chosen on the basis of the aforementioned security mapping. In encrypting the contents, the program code can utilize encryption scripts (and secured codes integration 244) to automatically encrypt data based on annotation data, based on continued changing of transactions 246. The program code can utilize a SafeMath Library for dynamic securing of contents 246.

In some embodiments of the present invention, the program code determines whether the smart contract contents are ready to be encrypted or protected 247. The program code determines whether to execute the protected codes or to review the outstanding items in the transactions and determine what contents of the smart contract the program code should encrypt or mask out. As the encryption is tied to client data and transaction data, the program code can prompt the client to provide additional data, through the web-only interface, if there is insufficient information to determine how to encrypt the contents of the smart contract. If the program code determines that the items are ready (i.e., sufficient data is available about the client and/or the transaction to determine the security), the program code executes protection codes 248 and stores the whole analysis and outcome in a smart contract secured database 250. If the program code determines that items are outstanding for review 249 before this storing can occur, the program code does not execute the protected codes, but sends the outstanding items to the end user portal 210 for review. The program code can obtain the revised data from this interface, map the data to a security level, and select and implement the encryption, as illustrated in FIG. 2.

As noted above and illustrated in FIG. 2, in encrypting the contents, the program code can utilize encryption scripts (and secured codes integration 244) to automatically encrypt data based on annotation data (based on continued changing of transactions 246). In instituting this encryption, the program code utilizes annotations in order to add contents about a transaction requirement, to provide better explanations of the contents of the smart contract to be used for the encryption activities. For example, in some embodiments of the present invention, the annotation data identifies patterns and confirms the contents to be used for verification. The portion of the program code that annotates the data can be understood as an annotator engine. In some embodiments of the present invention, the program code of the annotator engine obtains outputs from the analysis of the program code. This output can include, but is not limited to, a resolution, which is a highest probability that the transaction could be executed based on ability to meet all the criteria and based on a pre-defined timeline (defined transaction conditions). A transaction rule is business logic that defines that the transaction (initiated by the end user) needs to be run and completed within the pre-identified criteria and a timeline. The program code of the annotator engine will halt a transaction when the program code identifies high risk transactions based on an anomaly and outcomes identified by the program code utilizing the SafeMath Library. Hence, based on this annotation, the program code can ensure the regulatory and audit compliance are met within the operation environment.

The program code injects elements of the SafeMath Library to codes, to protect the transaction from inputs that could cause the smart contract to do unexpected things after overflow or underflow leading arithmetic operations. The program code dynamically secures the contents of the smart contract based on the check of codes reviewed via the SafeMath Library.

FIG. 2 also illustrates various aspects of a technical environment into which aspects of the present invention can be implemented. As illustrated in FIG. 2, embodiments of the present invention enable secure transactions under a smart contract in a web-only infrastructure (e.g., web system 210). The program code 240 in some embodiments of the present invention, could be deployed to executed on a virtual machine (VM), and could capture and verify all the contents of the smart contract. This VM could be integrated with the security risk intelligence engine (referenced at 241), SafeMath library codes 246, encryption codes 244, and/or the encryption keys 242, 243, which could all reside on shared and/or separate physical and/or virtual resources. In some embodiments of the present invention, program code executing aspects of the present invention is deployed to a multi-cloud environment where there is no physical branch office for a client to visit.

Figure 3:
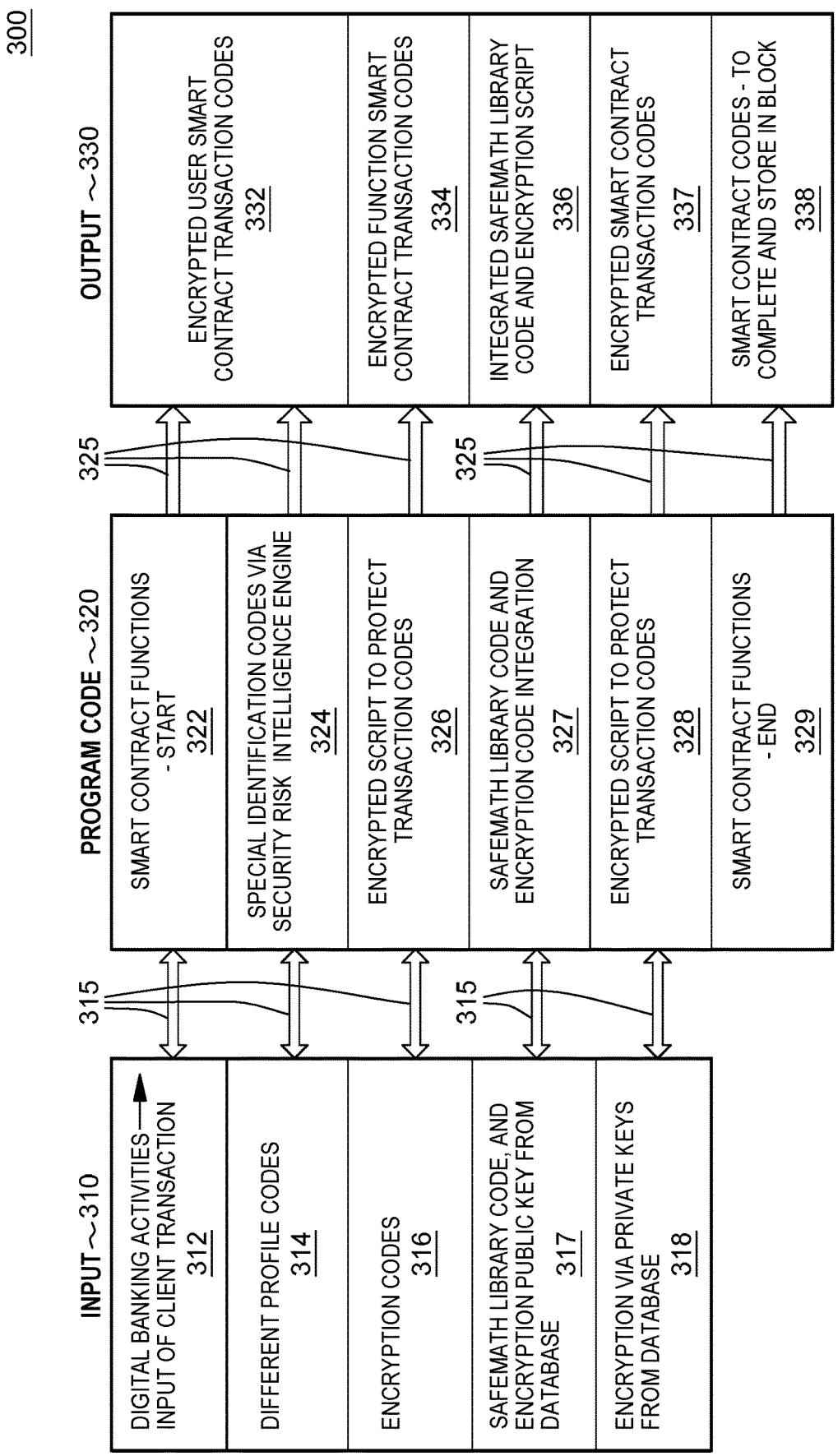
FIG. 3 is a workflow that depicts inputs, outputs, and processing performed by program code executing on one or more processors, in some embodiments of the present invention.

FIG. 3 is an overview 300 of various aspects of some embodiments of the present invention and highlights inputs 310 and outputs 330 of various embodiments of the present invention and functionality of the program code 320 in various embodiments of the present invention. Input 310 (obtained by the program code 320) can originate from various sources (profile, information, functions, etc.), to enable the program code to continue executing transactions embedded in a smart contract. Contents of the input 310 can include, in some embodiments of the present invention, but is not limited to, digital banking activities, which include the input of a client transaction 312, different profile codes 314, encryption codes 316, a SafeMath Library code and an encryption public key from a database 317, encryption via private keys from the database 318, integration constructs, risk controls, and/or encryption codes. Obtaining input from different sources enables the program code 320 to continue executing transactions embedded in a smart contract. As illustrated in FIG. 3 the program code and the sources of input 310 have bi-directional interactions 315.

As illustrated in FIG. 3, upon obtaining the inputs 310, the program code incorporates security components to ensure security and protection of smart contracts activities, including but not limited to, the transaction 312. Upon obtaining, the input 310 of the client transaction 312, the program code initiates the smart contract functionality 322. Based on obtaining different profile codes 314, the program code utilizes a security risk intelligence engine to associate the input (the user information) with special identification codes 324. The program code utilizes this risk engine to determine a level of security based on the transaction profile and/or the user initiating the transaction. The program code obtains the SafeMath Library code and encryption public key from the database 317 and integrates both elements into the encryption 327, as discussed in more detail in FIG. 2. Based on obtaining encryption via private keys from the database 318, the program code automatically executes an encrypted script to protect the transaction codes 328. Hence, the program code terminates functionality associated with the smart contract 329. Hence, based on obtaining the inputs 310, the program code 320, in some embodiments of the present invention: 1) generates special identification codes via a security risk intelligence engine; 2) derives a unique encrypted script to protect transaction code; 3) integrates SafeMath Library code and encryption code; and 4) incorporates the encrypted script to protect the smart contract transaction code.

The output 330 of the program code 320 to the program code is not bi-directional, in some embodiments of the present invention, as illustrated as a one-way interaction 325 in FIG. 3. The output ensures transactions captured in the smart contract are protected. The program code 320 outputs 330 encrypted user smart contract transaction codes 332, encrypted function smart contract transaction codes 334, integrated SafeMath Library code and an encryption script 336, encrypted smart contract transaction codes 337, and smart contract codes, to complete and store in a block 338 (in a secured database). The usage of the SafeMath Library by the program code protects the smart contract from inputs that could make the smart contract do unexpected things after overflow or underflow leading arithmetic operations.

Figure 4:
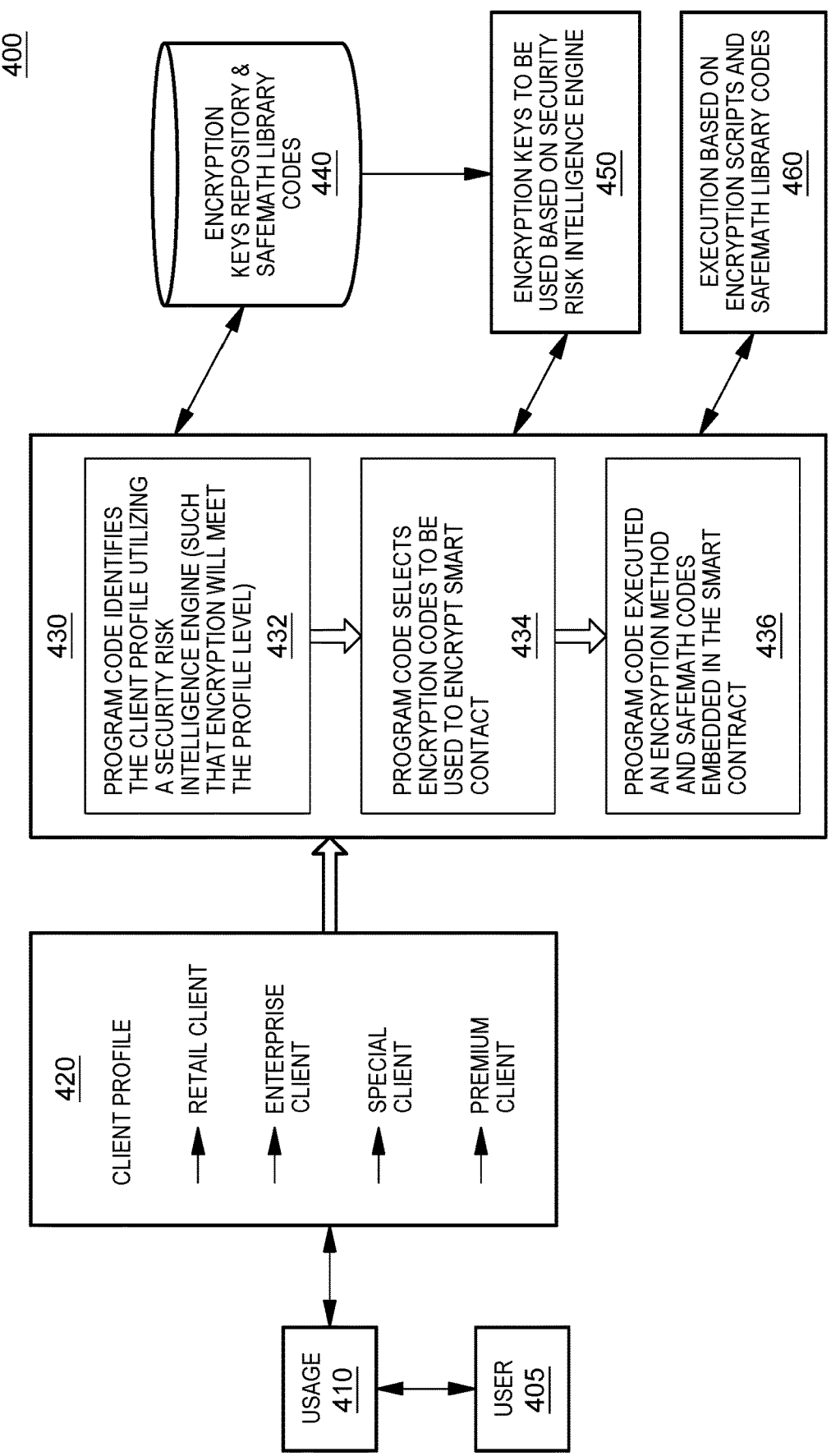
FIG. 4 depicts certain aspects of some embodiments of the present invention.

As illustrated in FIGS. 1-3, embodiments of the present invention include program code that captures the data from validating user information, matches this information with identified profiles and agreements via a smart contract, and stores contents of the smart contract in an encrypted environment, as dictated by a security level of the identified profiles. FIG. 4 focuses on the matching of the user information to the profile and how this aspect impacts the encryption of the smart contract by the program code.

FIG. 4 illustrates how, in embodiments of the present invention, when the program code identifies different transaction profiles based on the security risk intelligence engine, the program code protects the smart contract with different encryption scripts and integrates the smart contract with SafeMath Library codes. Hence, the program code ensures the smart contract will not be compromised and will be protected from abnormalities.

As illustrated in the workflow 400 of FIG. 4, a user 405, initiates a usage 410 of a web-enabled interface, for example, to initiate an electronic transaction with a financial institution, such as a back. The program code obtains data from the usage 410 to identify the client profile (420) of the user 405. Examples of various client profiles include, but are not limited to, a retail client, an enterprise client, a special client, and a premium client. The program code obtains the program profile and utilizes the profile to provide encryption (430). In some embodiments of the present invention, the program code identifies the client profile utilizing a security risk intelligence engine, such that the encryption performed by the program code will meet the profile level (432). In some embodiments of the present invention, the security risk intelligence engine comprises a finite group of pre-defined profiles and thus, the program code maps the user, based on the obtained user information, to a pre-existing profile. The program code obtains components to utilize in the encryption from a repository 440, including encryption keys and SafeMath library codes. The program code selects the encryption keys based on the mapping in the security risk intelligence engine (450). The level of encryption, based on the profile mapping, dictates the keys and codes extracted by the program code from the repository 440.

Returning to FIG. 4, based on mapping the user profile to a pre-defined profile (and level of security) based on the security risk intelligence engine, the program code selects encryption codes to be used to encrypt the smart contract (434). The transaction initiated by the user 405 is being initiated based on the smart contract and is said, in some examples, to be embedded in the smart contract. The program code (upon obtaining the encryption keys (450) from the repository 440) executes an encryption method that embeds SafeMath codes in the smart contract (436). The encryption is executed, by the program code, based on encryption scripts (generated utilizing the keys and the codes) (460).

Figure 5:
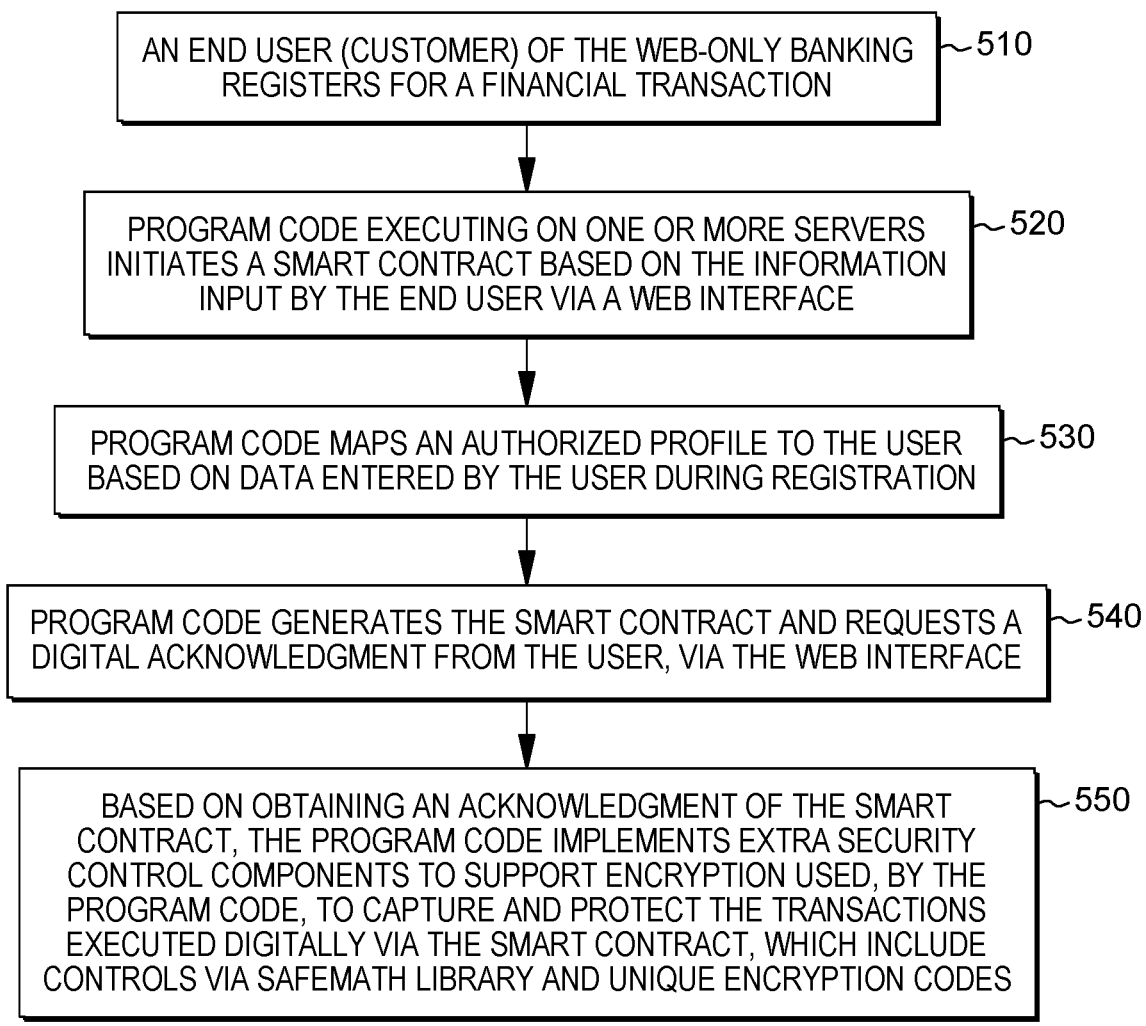
FIG. 5 is a workflow that illustrates certain aspects of some embodiments of the present invention.

FIG. 5 is a simplified workflow 500 that illustrates a particular implementation of some aspects of various embodiments of the present invention. As illustrated in FIG. 5, a financial institution is licensed to provide web-only banking, hence, an end user (customer) of the web-only banking registers for a financial transaction (510). Based on the registration, program code executing on one or more servers initiates a smart contract based on the information input by the end user via a web interface (520). The program code maps an authorized profile to the user based on data entered by the user during registration (530). To map the profile, in some embodiments of the present invention, the program code utilizes a risk formula intelligence engine. The program code generates the smart contract and requests a digital acknowledgment from the user, via the web interface (540). Based on obtaining an acknowledgment of the smart contract, the program code implements extra security control components to support encryption used, by the program code, to capture and protect the transactions executed digitally via the smart contract, which include controls via SafeMath Library and unique encryption codes (550).

Embodiments of the present invention include a computer-implemented method, a computer program product, and a computer system where program code executing on one or more processors obtains, via a web interface, from a client, over a public network connection, a request to register for a financial transaction. The request comprises client information and transaction information and a smart contract comprises the requested financial transaction. The program code maps the client to a pre-defined security profile, where the security profile comprises a protocol for encrypting contents of the smart contract based on a security level associated with the security profile. The program code selects, based on the security level, encryption keys from a repository. The program code selects, based on the security level, security codes. The program code executes an encryption script to automatically encrypt the contents of the smart contract. The encryption script utilizes the encryption keys and the security codes to encrypt the contents of the smart contract, where the executing comprises embedding SafeMath library codes in the smart contract.

In some embodiments of the present invention, the program code stores the encrypted contents of the smart contract in a secured database.

In some embodiments of the present invention, the program code maps based on information selected from the group consisting of: client information and transaction information.

In some embodiments of the present invention, the program code maps mapping the client to the pre-defined security profile by: executing a security risk calculation; and based on results of the security risk calculation, utilizing a security risk intelligence engine to identify the pre-defined security profile.

In some embodiments of the present invention, the security codes are selected from the group consisting of: user encryption codes and transaction encryption codes.

In some embodiments of the present invention, the program code obtains, based on the request, terms and conditions for the financial transaction. The program code executes the encryption script and the script execution annotates data comprising the smart contract based on the terms and conditions.

In some embodiments of the present invention, the encryption keys are selected from the group consisting of: public keys and private keys.

In some embodiments of the present invention, the program code generates the smart contract.

In some embodiments of the present invention, prior to selecting the encryption keys from the repository, based on the mapping, the program code generates generating the smart contract. The program code requests, via the web interface, an acknowledgment of the smart contract from the client. The program code obtains, via the web interface, the acknowledgment of the smart contract from the client.

In some embodiments of the present invention, the public network connection comprises an Internet connection.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the web-only system 210 (FIG. 2), database for keys 242, 243 (FIG. 2), the secure database 250 (FIG. 2), and the one or more servers executing the program code 320 (FIG. 3), can each be understood as a cloud computing node 10 (FIG. 6) and if not a cloud computing node 10, then one or more general computing nodes that include aspects of the cloud computing node 10.

In cloud computing node 10, there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 6, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, containers, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
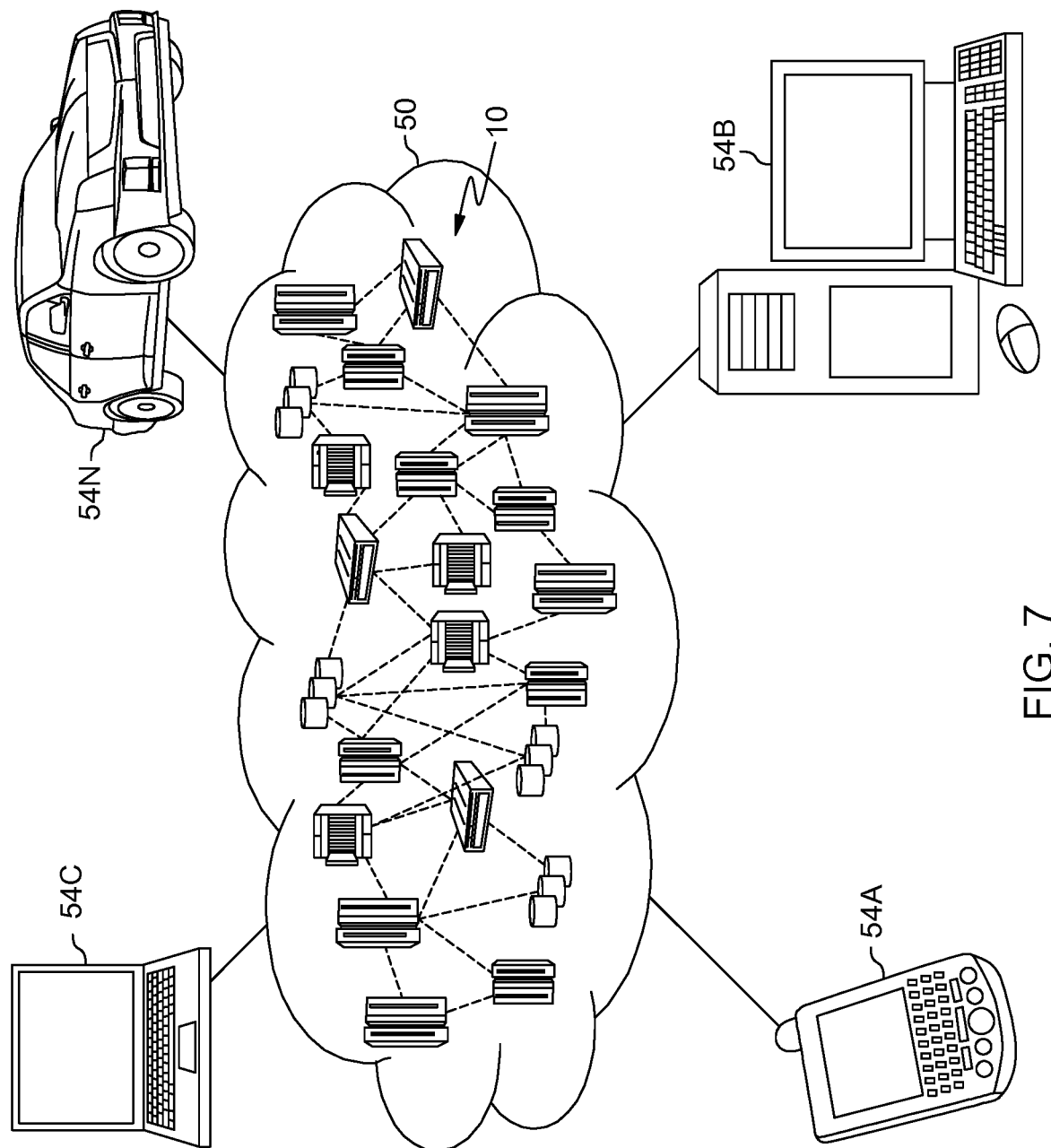
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
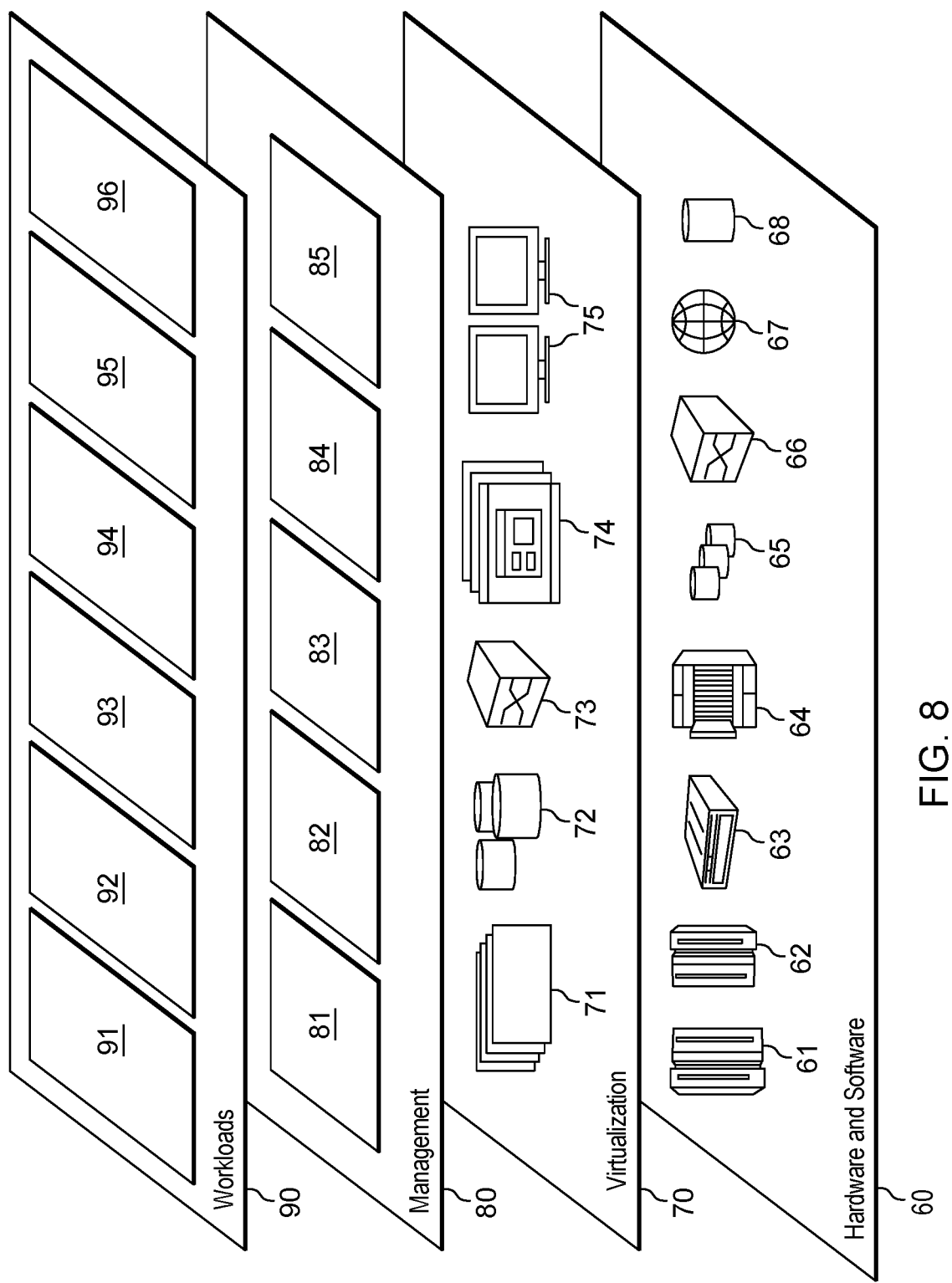
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; securing contents of a smart contract in order to monitor transactions executed under the contract 96.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors, via a web interface, from a client, over a public network connection, a request to register for a financial transaction, wherein the request comprises client information and transaction information, wherein a smart contract comprises the financial transaction;
    mapping, by the one or more processors, the client to a pre-defined security profile, wherein the pre-defined security profile comprises a protocol for encrypting contents of the smart contract based on a security level associated with the pre-defined security profile;
    selecting, by the one or more processors, based on the security level, encryption keys from a repository;
    selecting, by the one or more processors, based on the security level, security codes; and
    executing, by the one or more processors, an encryption script, to automatically encrypt the contents of the smart contract, wherein the encryption script utilizes the encryption keys and the security codes to encrypt the contents of the smart contract, wherein the executing comprises embedding SafeMath library codes in the smart contract.

2. The computer-implemented method of claim 1, further comprising:
    storing, by the one or more processors, the encrypted contents of the smart contract in a secured database.

3. The computer-implemented method of claim 1, wherein the mapping is based on information selected from the group consisting of: client information and transaction information.

4. The computer-implemented method of claim 1, wherein mapping the client to the pre-defined security profile further comprises:
    executing, by the one or more processors, a security risk calculation; and
    based on results of the security risk calculation, utilizing, by the one or more processors, a security risk intelligence engine to identify the pre-defined security profile.

5. The computer implemented method of claim 1, wherein the security codes are selected from the group consisting of: user encryption codes and transaction encryption codes.

6. The computer-implemented method of claim 1, further comprising:
    obtaining, by the one or more processors, based on the request, terms and conditions for the financial transaction, wherein executing the encryption script further comprises annotating data comprising the smart contract based on the terms and conditions.

7. The computer-implemented method of claim 1, wherein the encryption keys are selected from the group consisting of: public keys and private keys.

8. The computer-implemented method of claim 1, further comprising:
    generating, by the one or more processors, the smart contract.

9. The computer-implemented method of claim 8, further comprising:
    prior to selecting the encryption keys from the repository:
        based on the mapping, generating, by the one or more processors, the smart contract;
        requesting, by the one or more processors, via the web interface, an acknowledgment of the smart contract from the client; and
        obtaining, by the one or more processors, via the web interface, the acknowledgment of the smart contract from the client.

10. The computer-implemented method of claim 1, wherein the public network connection comprises an Internet connection.

11. A computer program product comprising:
    a computer readable storage medium readable by one or more processors and storing instructions for execution by the one or more processors for performing a method comprising:
        obtaining, by the one or more processors, via a web interface, from a client, over a public network connection, a request to register for a financial transaction, wherein the request comprises client information and transaction information, wherein a smart contract comprises the financial transaction;

mapping, by the one or more processors, the client to a pre-defined security profile, wherein the pre-defined security profile comprises a protocol for encrypting contents of the smart contract based on a security level associated with the pre-defined security profile;

selecting, by the one or more processors, based on the security level, encryption keys from a repository;

selecting, by the one or more processors, based on the security level, security codes; and executing, by the one or more processors, an encryption script, to automatically encrypt the contents of the smart contract, wherein the encryption script utilizes the encryption keys and the security codes to encrypt the contents of the smart contract, wherein the executing comprises embedding SafeMath library codes in the smart contract.

12. The computer program product of claim 11, the method further comprising:

storing, by the one or more processors, the encrypted contents of the smart contract in a secured database.

13. The computer program product of claim 11, wherein the mapping is based on information selected from the group consisting of: client information and transaction information.

14. The computer program product of claim 11, wherein mapping the client to the pre-defined security profile further comprises:

executing, by the one or more processors, a security risk calculation; and based on results of the security risk calculation, utilizing, by the one or more processors, a security risk intelligence engine, to identify the pre-defined security profile.

15. The computer program product of claim 11, wherein the security codes are selected from the group consisting of: user encryption codes and transaction encryption codes.

16. The computer program product of claim 11, the method further comprising:

obtaining, by the one or more processors, based on the request, terms and conditions for the financial transaction, wherein executing the encryption script further comprises annotating data comprising the smart contract based on the terms and conditions.

17. The computer program product of claim 11, wherein the encryption keys are selected from the group consisting of: public keys and private keys.

18. The computer program product of claim 11, the method further comprising:

generating, by the one or more processors, the smart contract.

19. The computer program product of claim 18, the method further comprising:

prior to selecting the encryption keys from the repository:

based on the mapping, generating, by the one or more processors, the smart contract;

requesting, by the one or more processors, via the web interface, an acknowledgment of the smart contract from the client; and obtaining, by the one or more processors, via the web interface, the acknowledgment of the smart contract from the client.

20. A system comprising:

a memory;

one or more processors in communication with the memory;

program instructions executable by the one or more processors via the memory to perform a method, the method comprising:

obtaining, by the one or more processors, via a web interface, from a client, over a public network connection, a request to register for a financial transaction, wherein the request comprises client information and transaction information, wherein a smart contract comprises the financial transaction;

mapping, by the one or more processors, the client to a pre-defined security profile, wherein the pre-defined security profile comprises a protocol for encrypting contents of the smart contract based on a security level associated with the pre-defined security profile;

selecting, by the one or more processors, based on the security level, encryption keys from a repository;

selecting, by the one or more processors, based on the security level associated with the pre-defined security profile, security codes; and executing, by the one or more processors, an encryption script, to automatically encrypt the contents of the smart contract, wherein the encryption script utilizes the encryption keys and the security codes to encrypt the contents of the smart contract, wherein the executing comprises embedding SafeMath library codes in the smart contract.

* * * * *